United States Patent
Yamashita et al.

(10) Patent No.: US 10,069,438 B2
(45) Date of Patent: Sep. 4, 2018

(54) POWER CONVERTER WITH CAPACITOR VOLTAGE BALANCING

(71) Applicant: OMRON Corporation, Kyoto-shi, Kyoto (JP)

(72) Inventors: Tomomi Yamashita, Kusatsu (JP); Kenji Kobayashi, Moriyama (JP); Masao Mabuchi, Moriyama (JP); Satoru Ikemoto, Omihachiman (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/624,949

(22) Filed: Jun. 16, 2017

(65) Prior Publication Data

US 2018/0019685 A1    Jan. 18, 2018

(30) Foreign Application Priority Data

Jul. 13, 2016    (JP) .................................. 2016-138267

(51) Int. Cl.
*H02M 7/487* (2007.01)
*H02M 7/539* (2006.01)
*H02J 7/34* (2006.01)

(52) U.S. Cl.
CPC ........... *H02M 7/487* (2013.01); *H02M 7/539* (2013.01); *H02J 7/345* (2013.01)

(58) Field of Classification Search
CPC ...... H02M 7/483; H02M 7/487; H02M 7/537; H02M 7/539
See application file for complete search history.

(56) References Cited

U.S. PATENT DOCUMENTS

| 6,031,738 A | * | 2/2000 | Lipo | H02M 7/487 363/37 |
| 6,490,185 B1 | * | 12/2002 | Yamanaka | H02M 7/487 363/132 |
| 2005/0111246 A1 | * | 5/2005 | Lai | H02M 5/225 363/157 |
| 2011/0279070 A1 | * | 11/2011 | Tanaka | H02P 6/181 318/400.1 |
| 2012/0281442 A1 | * | 11/2012 | Revelant | H02M 7/487 363/40 |
| 2015/0236609 A1 | * | 8/2015 | Kato | H02M 7/06 363/78 |
| 2016/0065049 A1 | * | 3/2016 | Wu | H02M 1/12 363/40 |

FOREIGN PATENT DOCUMENTS

| JP | H06-261551 A | 9/1994 |
| JP | H08-231956 A | 9/1996 |
| JP | H08-317663 A | 11/1996 |

* cited by examiner

*Primary Examiner* — Jeffrey Gblende
*Assistant Examiner* — David A. Singh
(74) *Attorney, Agent, or Firm* — Metrolexis Law Group, PLLC (57) ABSTRACT

During a single-phase three-wire output control process for causing a neutral point clamped inverter circuit to have a single-phase three-wire output, a power converter performs a potential control process for changing a potential of the O terminal to a positive or negative value to allow more power to be consumed from power stored in one of first and second capacitors with a higher voltage than from power stored in the other one of the first and second capacitors.

7 Claims, 11 Drawing Sheets

Mode 2

Mode 1

FIG. 6A

Mode 3

FIG. 6B

Mode 4

Discharging mode

FIG. 9B

Charging mode

POWER CONVERTER WITH CAPACITOR VOLTAGE BALANCING

CROSS REFERENCE TO RELATED APPLICATIONS

This application claims priority from prior Japanese Patent Application No. 2016-138267 filed with the Japan Patent Office on Jul. 13, 2016, the entire contents of which are incorporated herein by reference.

FIELD

The disclosure relates to a power converter, and more particularly, to a power converter including a neutral point clamped inverter circuit that is controlled to have a three-phase alternating current (AC) output or a single-phase three-wire output.

BACKGROUND

Neutral point clamped inverter circuits known in the art divide an input voltage using two capacitors connected in series, and output, for example, a three-phase AC (refer to, for example, Patent Literatures 1 to 3). Such an inverter circuit can be used to form a power conditioner that provides a three-phase AC to the utility grid during grid-connected operation, and has a single-phase three-wire output during isolated operation.

However, the two capacitors for dividing the input voltage can have an imbalance between their voltages (voltages across the two capacitors can differ from each other) depending on the use condition of the power conditioner including the neutral point clamped inverter circuit. When the power converter has such an imbalance between the capacitor voltages, the power converter cannot provide a normal output voltage, or can have an overcurrent or an overvoltage applied to the components of the inverter circuit, which may then damage the inverter circuit.

CITATION LIST

Patent Literature

Patent Literature 1: Japanese Unexamined Patent Application Publication No. 8-317663
Patent Literature 2: Japanese Unexamined Patent Application Publication No. 6-261551
Patent Literature 3: Japanese Unexamined Patent Application Publication No. 8-237956

SUMMARY

Technical Problem

One or more embodiments of the present invention are directed to a power converter including a neutral point clamped inverter circuit that is controlled to have a three-phase AC output or a single-phase three-wire output, which can reduce the failures described above at its single-phase three-wire output.

Solution to Problem

In response to the above issue, a first aspect of the present invention provides a power converter including a neutral point clamped inverter circuit including a first capacitor and a second capacitor that are connected in series to divide an input direct-current (DC) voltage by half, a plurality of switching elements, and first to third output terminals, and a controller that performs a single-phase three-wire output control process for causing the inverter circuit to output a first AC voltage from between the first output terminal and the second output terminal and output a second AC voltage having an inverted polarity from the first AC voltage from between the third output terminal and the second output terminal. During the single-phase three-wire output control process, the controller performs a potential control process for changing a potential of the second output terminal to a positive or negative value to allow more power to be consumed from power stored in one of the first and second capacitors with a higher voltage than from power stored in the other one of the first and second capacitors.

The potential control process allows the voltage across one of the capacitors having a higher voltage to approach the voltage across the other capacitor. The power converter according to the aspect of the present invention thus reduces failures that can be caused by an imbalance between the capacitor voltages, including failures to provide a normal single-phase three-wire output.

The potential control process may be, for example, either a first process of changing the potential of the second output terminal to a positive or negative value to cause a time average to be zero within one switching cycle, or a second process of changing the potential of the second output terminal to a positive or negative value with a time taken for the potential of the second output terminal to be a positive value and a time taken for the potential of the second output terminal to be a negative value corresponding to a voltage difference between a voltage across the first capacitor and a voltage across the second capacitor. The first process can remove the imbalance between the voltages across the capacitors substantially without adversely affecting the waveforms of the voltages. The second process can reduce the imbalance between the voltages across the capacitors in a short time.

The power converter according to the above aspect may constantly perform the potential control process. However, the control process may be eliminated when the voltage across the first capacitor is substantially equal to the voltage across the second capacitor. Thus, the controller may start the potential control process when the capacitor voltage difference between the voltage across the first capacitor and the voltage across the second capacitor is more than or equal to a first predetermined value, and may end the potential control process when the capacitor voltage difference is less than or equal to a second predetermined value smaller than the first predetermined value.

The power converter according to the above aspect is typically a power converter in which the first to third output terminals are connected to a utility grid and a power consuming device, and the controller starts the single-phase three-wire output control process when receiving an instruction to start isolated operation, or in other words, the controller functions as a power conditioner. The connection to a power consuming device may be achieved through, for example, a wall outlet. The power converter may be implemented as a device other than a power conditioner.

In the power converter according to the above aspect, the controller may determine whether a voltage difference between a voltage across the first capacitor and a voltage across the second capacitor is less than or equal to a predetermined threshold when receiving an instruction to start isolated operation, and start the single-phase three-wire output control process after performing a capacitor voltage balancing process for reducing the voltage difference when the voltage difference exceeds the threshold, and start the single-phase three-wire output control process without performing the capacitor voltage balancing process when the voltage difference is less than or equal to the threshold. The controller having this capability reduces the failures described above that can occur when the single-phase three-wire output control process is started with a large difference between the voltages across the first and second capacitors.

The capacitor voltage balancing process may include controlling the inverter circuit to charge one of the first and second capacitors having a lower voltage using power stored in the other one of the first and second capacitors having a higher voltage.

Advantageous Effects

The power converter according to embodiments includes the neutral point clamped inverter circuit that is controlled to perform a three-phase AC output or a single-phase three-wire output, and can reduce failures caused by an imbalance between the capacitor voltages at its single-phase three-wire output.

DETAILED DESCRIPTION

Embodiments of the present invention will now be described with reference to the drawings.

Figure 1:
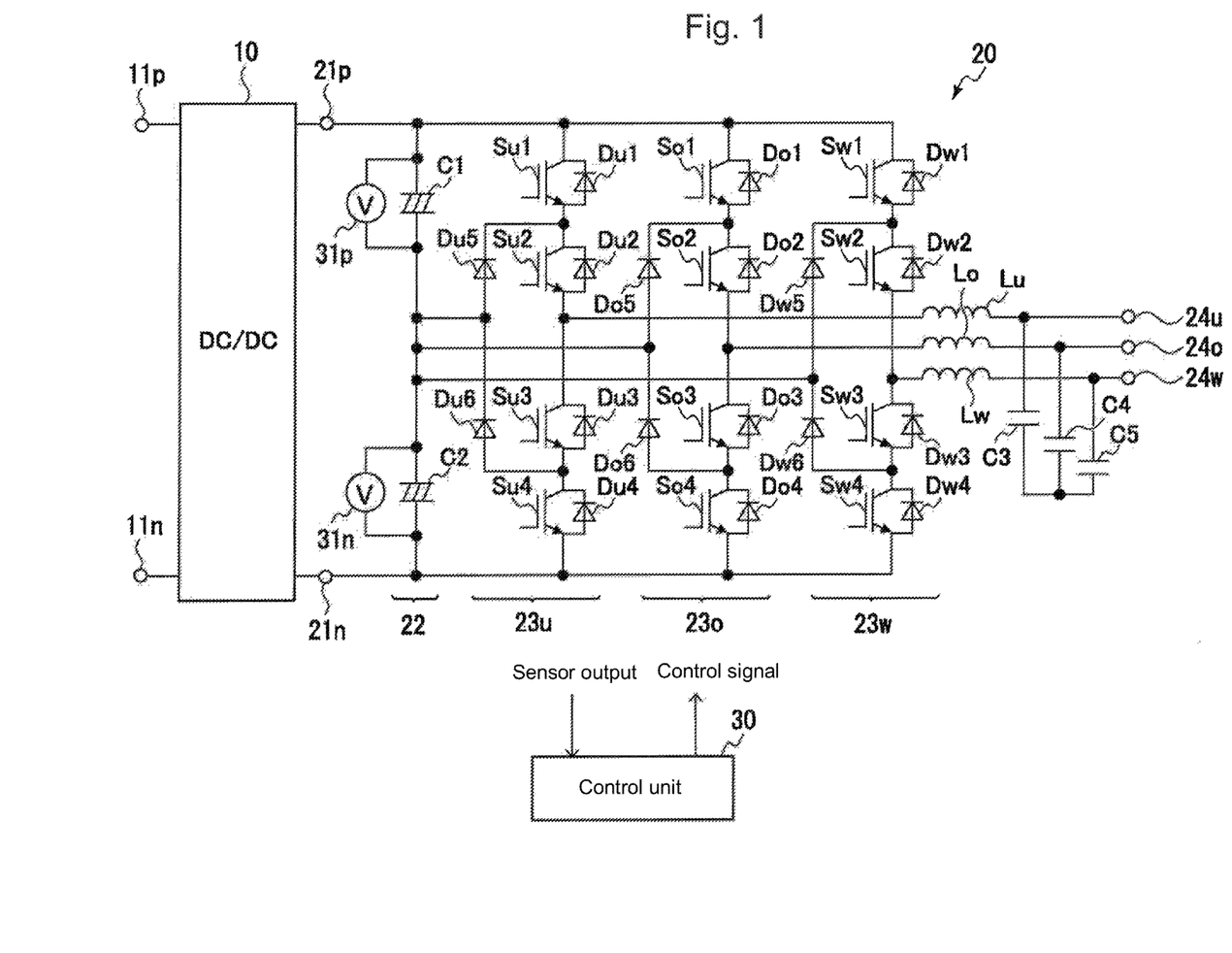
FIG. 1 is a schematic diagram of a power converter according to one embodiment of the present invention.

FIG. 1 is a schematic diagram of a power converter according to one embodiment of the present invention.

The power converter according to the present embodiment is a power conditioner capable of grid-connected operation for supplying power generated by a direct-current (DC) power generator (a photovoltaic array in the present embodiment) to the utility grid, and isolated operation for supplying power from the DC power generator to various loads, or devices that can operate on alternating current (AC) power.

As shown in the figure, the power converter includes an input terminal 11p and an input terminal 11n, to which the DC power generator is connected, a DC-DC conversion circuit 10, an inverter circuit 20, and a control unit 30. The input terminal 11p is a positive (high potential) input terminal. The input terminal 11n is a negative (low potential) input terminal. Although not shown, the power converter further includes a relay (grid relay) for connecting the output terminals (a U terminal 24u, an O terminal 24o, and a W terminal 24w) of the inverter circuit 20 to the utility grid, 100 V and 200 V outlets for isolated operation, and a relay (outlet relay) for connecting the output terminals of the inverter circuit 20 to the outlets.

The DC-DC conversion circuit 10 raises a voltage input from the input terminals 11p and 11n of the power converter. Depending on the output voltage of the DC power generator connected to the power converter, the DC-DC conversion circuit 10 may be a circuit that only lowers an input voltage or a circuit that both raises and lowers an input voltage.

The inverter circuit 20 is a neutral point clamped (NPC) inverter circuit with clamping diodes. As shown in the figure, the inverter circuit 20 includes an input terminal 21p, an input terminal 21n, the U terminal 24u, the O terminal 24o, and the W terminal 24w. The inverter circuit 20 further includes a voltage dividing circuit 22, a U-phase leg 23u, an O-phase leg 23o, and a W-phase leg 23w, which are connected in parallel between the input terminals 21p and 21n.

The input terminals 21p and 21n receive the voltage raised by the DC-DC conversion circuit 10. In the same manner as the input terminals 11p and 11n, the input terminal 21p is a positive input terminal, and the input terminal 21n is a negative input terminal.

The voltage dividing circuit 22 includes a first capacitor C1 and a second capacitor C2 with the same capacitance that are connected in series. The voltage dividing circuit 22 normally divides a voltage V applied between the input terminals 21p and 21n into a half voltage (voltage across the first capacitor C1) and a half voltage (voltage across the second capacitor C2). A node between the first capacitor C1 and the second capacitor C2 in the voltage dividing circuit 22 is hereafter referred to as a neutral point.

As shown in the figure, the voltage dividing circuit 22 has a voltage sensor 31p for measuring the voltage across the first capacitor C1 and a voltage sensor 31n for measuring the voltage across the second capacitor C2.

The U-phase leg 23u changes the potential of the U terminal 24u. As shown in the figure, the U-phase leg 23u includes switching elements Su1 to Su4 that are connected in series, and diodes Dum that are connected in parallel to the switching elements Sum (m=1 to 4). The U-phase leg 23u further includes a diode Du5, which supplies a current from the neutral point to a wire between the switching elements Su1 and Su2, and a diode Du6, which supplies a current from a wire between the switching elements Su3 and Su4 to the neutral point. Between the switching elements Su2 and Su3 of the U-phase leg 23u, the U terminal 24u is connected via a reactor Lu.

The O-phase leg 23o changes the potential of the O terminal 24o. As shown in the figure, the O-phase leg 23o includes switching elements So1 to So4 that are connected in series, and diodes Dom that are connected in parallel to the switching elements Som (m=1 to 4). The O-phase leg 23o further includes a diode Do5, which supplies a current from the neutral point to a wire between the switching elements So1 and So2, and a diode Do6, which supplies a current from a wire between the switching elements So3 and So4 to the neutral point. Between the switching elements So2 and So3 of the O-phase leg 23o, the O terminal 24o is connected via a reactor Lo.

The W-phase leg 23w changes the potential of the W terminal 24w. As shown in the figure, the W-phase leg 23w includes switching elements Sw1 to Sw4 that are connected in series, and diodes Dwm that are connected in parallel to the switching elements Swm (m=1 to 4). The W-phase leg 23w further includes a diode Dw5, which supplies a current from the neutral point to a wire between the switching elements Sw1 and Sw2, and a diode Dw6, which supplies a current from a wire between the switching elements Sw3 and Sw4 to the neutral point. Between the switching elements Sw2 and Sw3 of the W-phase leg 23w, the W terminal 24w is connected via a reactor Lw.

As shown in the figure, one terminal of a capacitor C5 is connected to the wire connecting the reactor Lw and the W terminal 24w, and one terminal of a capacitor C4 is connected to the wire connecting the reactor Lo and the O terminal 24o. One terminal of a capacitor C3 is connected to the wire connecting the reactor Lu and the U terminal 24u. The capacitor C5 has the other terminal connected to the other terminal of the capacitor C3 and the other terminal of the capacitor C4.

The control unit 30 controls a processor (a microcontroller in the present embodiment), and the DC-DC conversion circuit 10 and the inverter circuit 20 each including a gate driver integrated circuit (IC) and other components. The control unit 30 receives outputs from various sensors including the voltage sensors 31p and 31n described above. The control unit 30 controls the DC-DC conversion circuit 10 and the inverter circuit 20 based on the received information in the manner described below.

Both in grid-connected operation and in isolated operation, the control unit 30 controls the DC-DC conversion circuit 10 with maximum power point tracking (MPPT). The control unit 30 controls the inverter circuit 20 differently between grid-connected operation and isolated operation.

For grid-connected operation connected to, for example, a three-phase AC grid, the control unit 30 performs a three-phase AC output control process, or controls the inverter circuit 20 to have the output terminals (the U terminal 24u, the O terminal 24O, and the W terminal 24w) functioning as three-phase AC output terminals. In other words, in grid-connected operation, the control unit 30 performs the three-phase AC output control process for controlling the inverter circuit 20 to output a three-phase AC from its output terminals.

In isolated operation, the control unit 30 controls the inverter circuit 20 to have its output terminals (the U terminal 24u, the O terminal 24o, and the W terminal 24w) functioning as single-phase three-wire output terminals.

Figure 2:
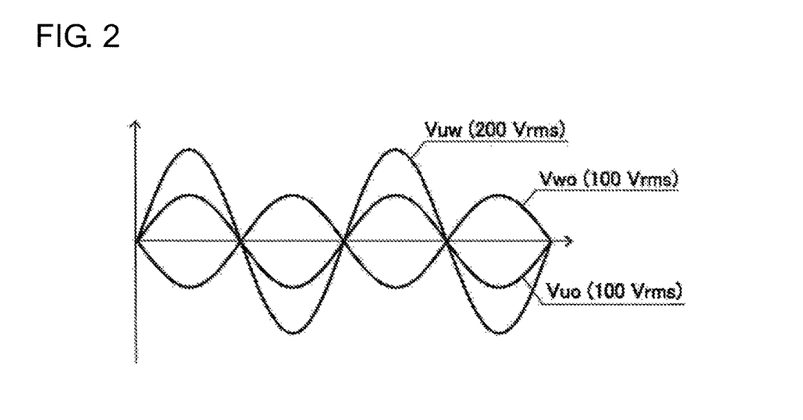
FIG. 2 is a diagram describing a single-phase three-wire output.

The inverter circuit 20 having output terminals functioning as single-phase three-wire output terminals herein refers to the voltage between the terminals undergoing temporal changes in the manner shown in FIG. 2. More specifically, the inverter circuit 20 having output terminals functioning as single-phase three-wire output terminals herein refers to an output voltage Vuo between the U terminal 24u and the O terminal 24o being an AC voltage of 100 Vrms, an output voltage Vwo between the W terminal 24w and the O terminal 24o being an AC voltage of 100 Vrms, which has an inverted polarity from the output voltage Vuo, and an output voltage Vuw between the U terminal 24u and the W terminal 24w being an AC voltage of 200 Vrms, which has the same phase as the output voltage Vuo.

The configuration and the functions of the power converter according to the present embodiment will now be described in detail. The power converter according to the present embodiment is designed (programmed) to have the control unit 30 executing special control over the inverter circuit 20 in isolated operation (more precisely in a period of transition to isolated operation and during isolated operation). The functions of the power converter according to the embodiment will be described focusing on the control over the inverter circuit 20 executed by the control unit 30 in isolated operation.

The basic control over the inverter circuit 20 executed by the control unit 30 in isolated operation will be described first.

Figure 3:
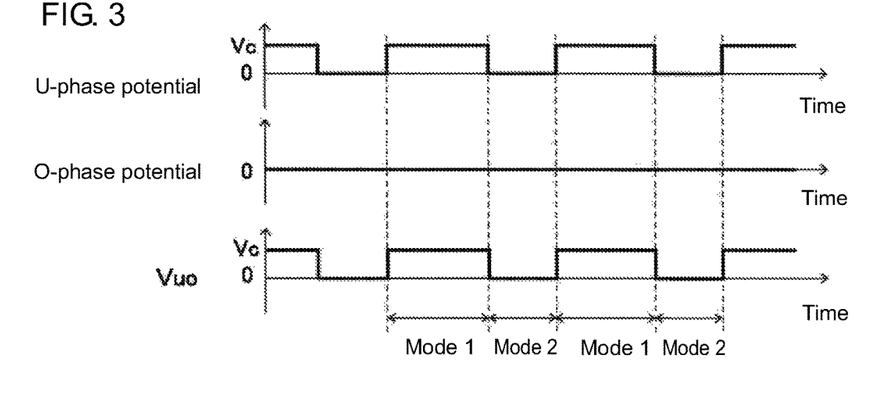
FIG. 3 is a time chart showing the patterns of temporal changes in a U-phase potential, an O-phase potential, and an output voltage Vuo when the voltage Vuo is positive.
Figure 4:
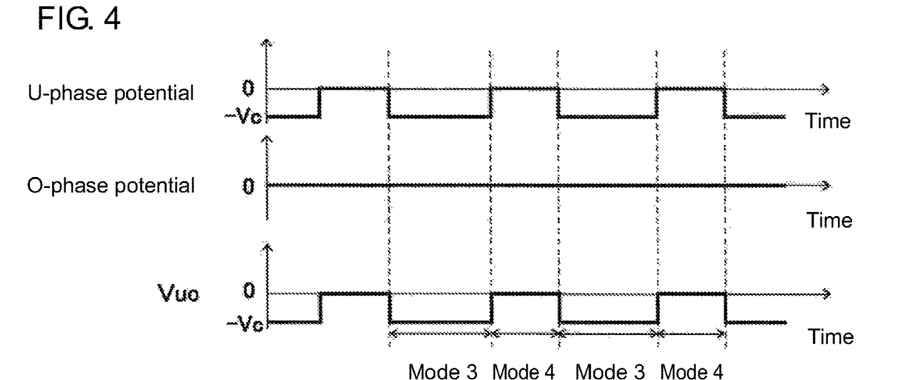
FIG. 4 is a time chart showing the patterns of temporal changes in the U-phase potential, the O-phase potential, and the output voltage Vuo when the voltage Vuo is negative.
Figure 5A:
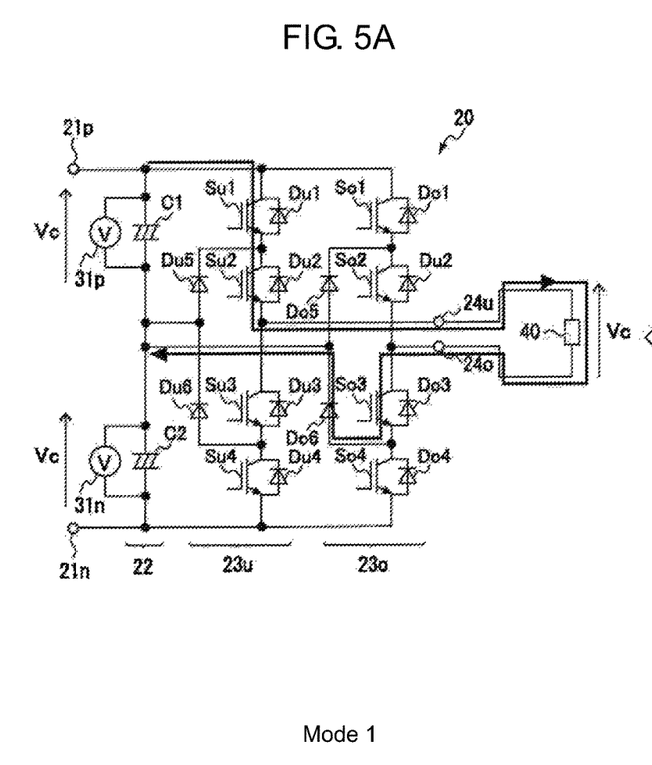
FIGS. 5A and 5B are diagrams describing the details of control executed by a control unit over an inverter circuit to have temporal changes in the potentials and the voltages shown in FIG. 3.
Figure 5B:
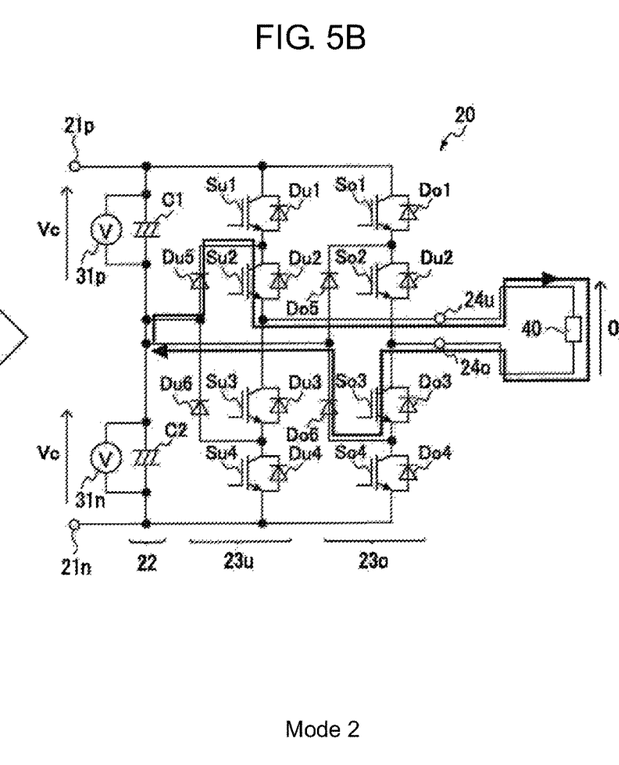
Figure 6A:
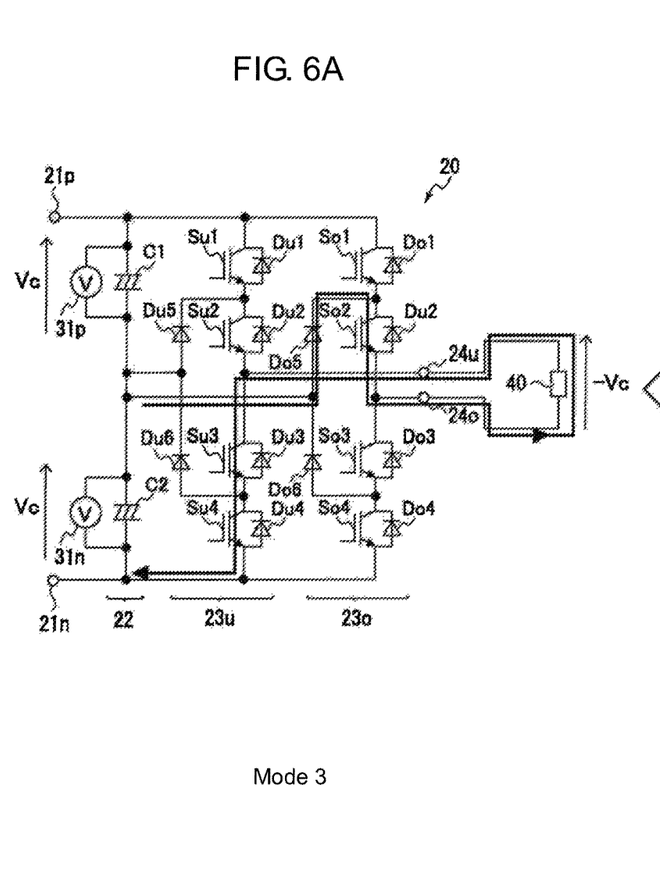
FIGS. 6A and 6B are diagrams describing the details of control executed by the control unit over the inverter circuit to have temporal changes in the potentials and the voltages shown in FIG. 4.
Figure 6B:
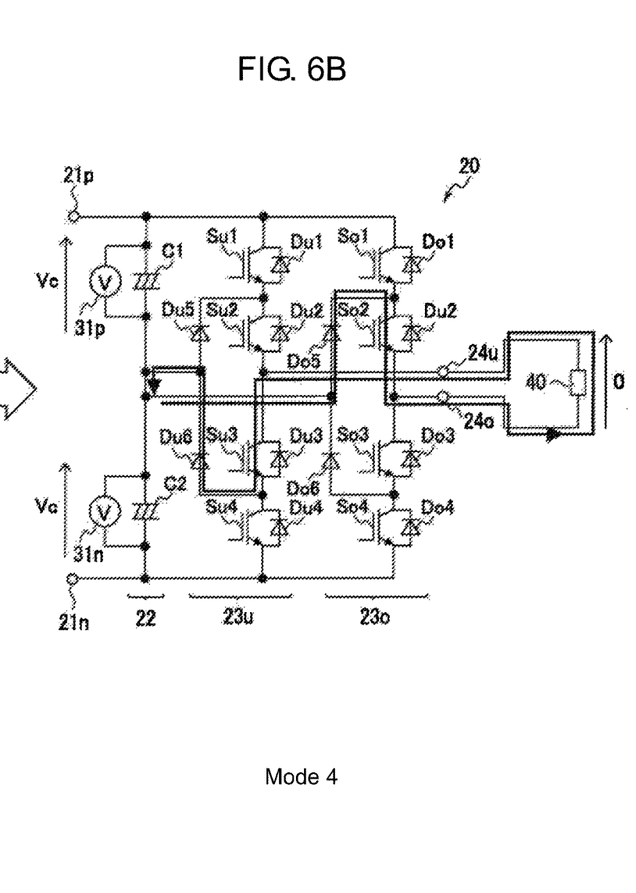

FIG. 3 shows temporal changes in a U-phase potential, an O-phase potential, and an output voltage Vuo when the voltage Vuo is positive. FIG. 4 shows temporal changes in the U-phase potential, the O-phase potential, and the output voltage Vuo when the voltage Vuo is negative. FIGS. 5A and 5B and FIGS. 6A and 6B show the details of control over the inverter circuit 20 executed by the control unit 30 to have temporal changes in the potentials and the voltages shown in FIGS. 3 and 4. The patterns of changes in the potentials and voltages shown in FIGS. 3 and 4 do not reflect smoothing to be performed by the reactors Lu, Lo, and Lw and the capacitors C3 to C5. The U-phase potential, the O-phase potential, and a W-phase potential in FIGS. 3 and 4 herein refer to the potentials of the U terminal 24u, the O terminal 24o, and the W terminal 24w using the potentials at their neutral points as a reference.

During isolated operation, as shown in FIGS. 3 and 4, the control unit 30 basically controls the inverter circuit 20 in a manner to cause the O-phase potential to be 0 V and the U-phase potential to have temporal changes. When the output voltage Vuo is positive, the control unit 30 controls the inverter circuit 20 to operate in the mode alternately switched between mode 1 (FIG. 5A), in which the voltage Vc across the first capacitor C1 is applied to a load 40, and mode 2 (FIG. 5B), in which no voltage is applied to the load 40 (both terminals of the load 40 are connected to the neutral point). When the output voltage Vuo is negative, the control unit 30 controls the inverter circuit 20 to operate in the mode alternately switched between mode 3 (FIG. 6A), in which the voltage Vc across the second capacitor C2 is applied to the load 40 in the direction opposite to when the output voltage Vuo is positive, and mode 4 (FIG. 6B), in which no voltage is applied to the load 40 (both terminals of the load 40 are connected to the neutral point).

The control unit 30 has a predetermined time period (switching cycle) corresponding to the total duration of mode 1 and mode 2 during the above control. The control unit 30 changes the ratio of the duration of mode 1 to the switching cycle in accordance with the Vuo value to be output as appropriate.

During isolated operation, the control unit 30 controls the inverter circuit 20 in a manner to cause the W-phase potential to be equal to an inverted U-phase potential (a potential obtained by inverting the polarity of the U-phase potential).

When the voltage across the first capacitor C1 is equal to the voltage across the second capacitor C2, the above control will provide a normal single-phase three-wire output (refer to FIG. 2). However, the capacitors can have an imbalance between their voltages (that is, the voltage across the first capacitor C1 can differ from the voltage across the second capacitor C2) depending on the use condition of the power converter. Under the capacitor voltages with such an imbalance, the power converter cannot provide a normal single-phase three-wire output, or can have an overcurrent or an overvoltage applied to the components of the inverter circuit 20, which may damage the inverter circuit 20.

Figure 7:
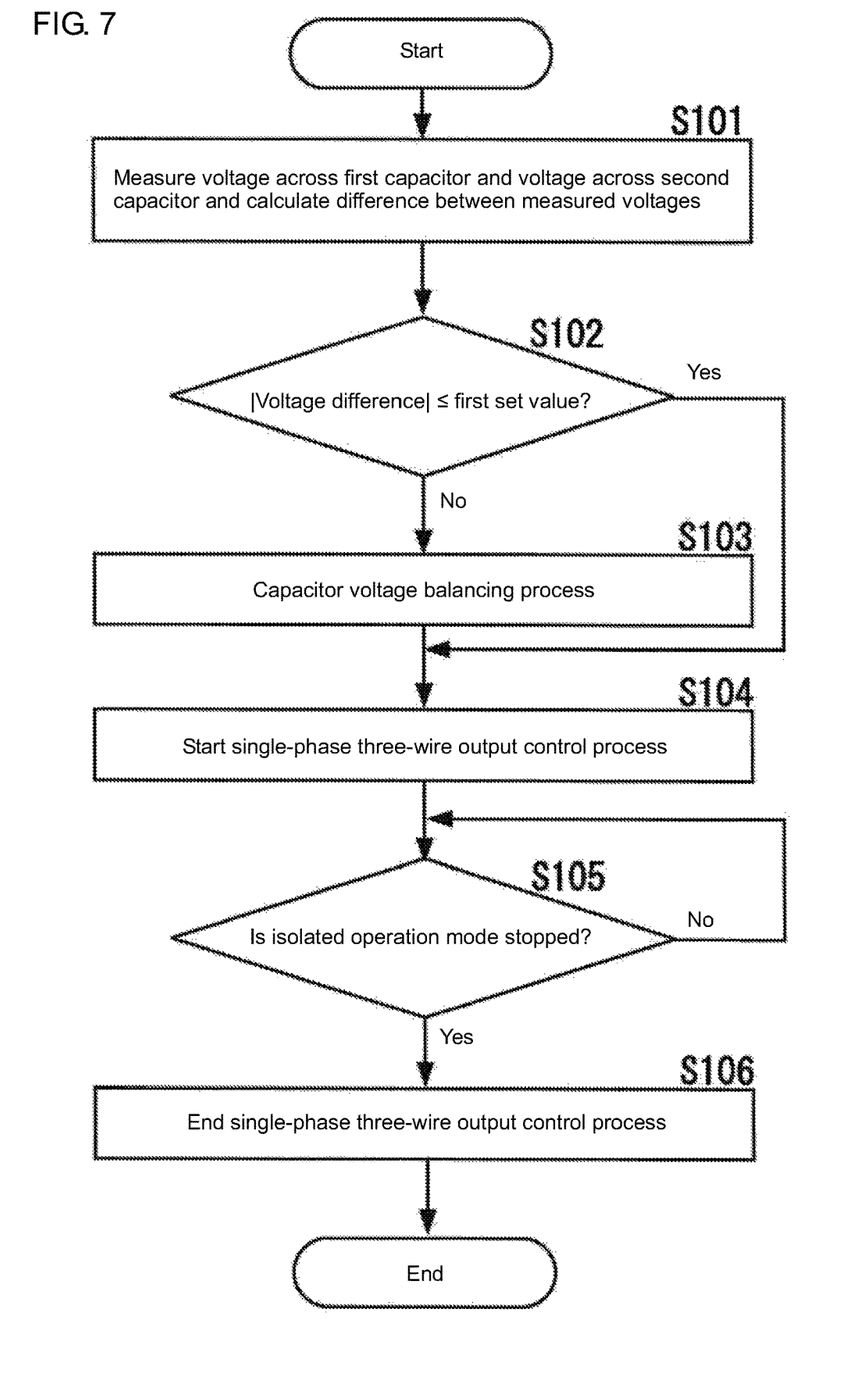
FIG. 7 is a flowchart showing an isolated-operation control process performed by the control unit in the power converter according to the embodiment.

To reduce such failures, the control unit 30 in the power converter according to the present embodiment is designed (programmed) to perform an isolated-operation control process with the procedure shown in FIG. 7 when receiving an instruction to start isolated operation. The processing in steps S101 to S103 in the isolated-operation control process is performed while the outlet relay and the grid relay are both turned off.

More specifically, the control unit 30 starts the isolated-operation control process in response to an instruction to start isolated operation. The control unit 30 first measures the voltage across the first capacitor C1 and the voltage across the second capacitor C2 using the voltage sensors 31p and 31n, and calculates a difference between the measured voltages (step S101).

The control unit 30 then determines whether the absolute value of the calculated voltage difference is less than or equal to a first set value (step S102). The first set value is a predetermined voltage difference that can cause the failures described above.

When the absolute value of the voltage difference exceeds the first set value (No in step S102), the control unit 30 performs a capacitor voltage balancing process in step S103.

The capacitor voltage balancing process is to charge one of the capacitors C1 and C2 by using power stored in the other capacitor, or specifically uses power accumulated in one of the capacitors C1 and C2 having a higher voltage across its two terminals to charge the other one of the capacitors C1 and C2, to reduce the voltage difference between the capacitors C1 and C2 to less than or equal to a predetermined second set value, which is smaller than the first set value.

The capacitor voltage balancing process will now be described in more detail using an example in which the voltage across the first capacitor C1 is higher than the voltage across the second capacitor C2.

When the voltage across the first capacitor C1 is higher than the voltage across the second capacitor C2, the control unit 30 performs the capacitor voltage balancing processes shown in FIGS. 8A to 9B. A reactor L0 and a capacitor C0 in FIGS. 8A to 10B, which will be described later, are respectively an inductance component corresponding to the reactor Lu and the reactor Lo and a capacitance component corresponding to the capacitor C3 and the capacitor C4.

More specifically, when the voltage across the first capacitor C1 is higher than the voltage across the second capacitor C2, the control unit 30 starts the capacitor voltage balancing process, and controls the inverter circuit 20 to operate in the mode alternately switched between a discharging mode (FIG. 8A) in which the reactor L0 and the capacitor C0 are charged with power discharged from the first capacitor C1, and a charging mode (FIG. 8B) in which the second capacitor C2 is charged with power charged in the reactor L0 and the capacitor C0. Through the current paths shown in FIGS. 9A and 9B, the first capacitor C1 is discharged and the second capacitor C2 is charged alternately. The switching between the operations in FIGS. 8A and 8B and the operations in FIGS. 9A and 9B may be performed at low frequencies, whereas the switching between the operations in FIGS. 8A and 9A and the operations in FIGS. 8B and 9B may be performed at high frequencies.

Figure 8A:
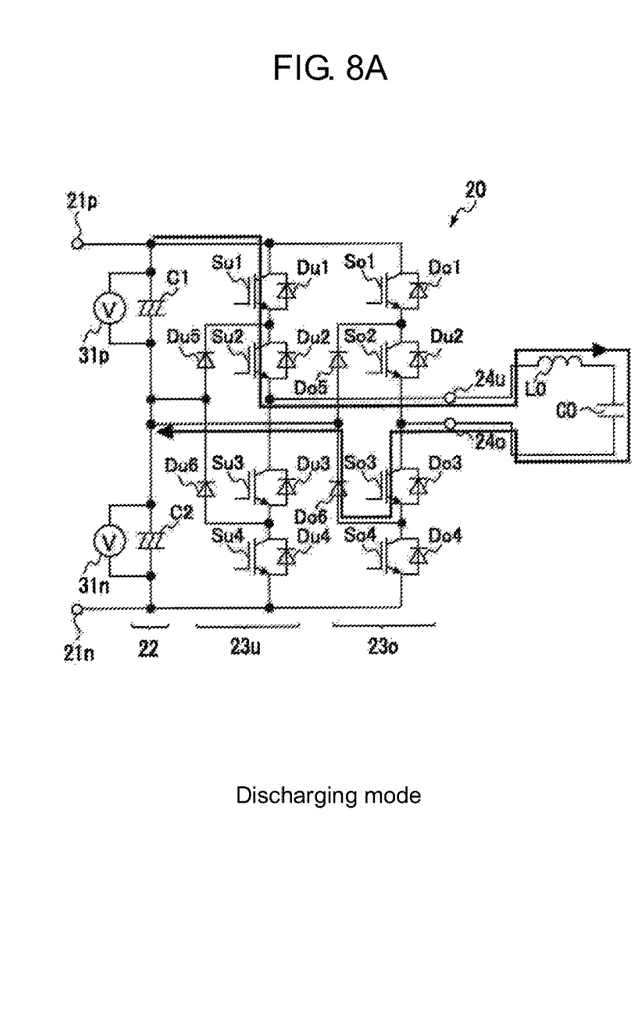
FIGS. 8A and 8B are diagrams describing a capacitor voltage balancing process.
Figure 8B:
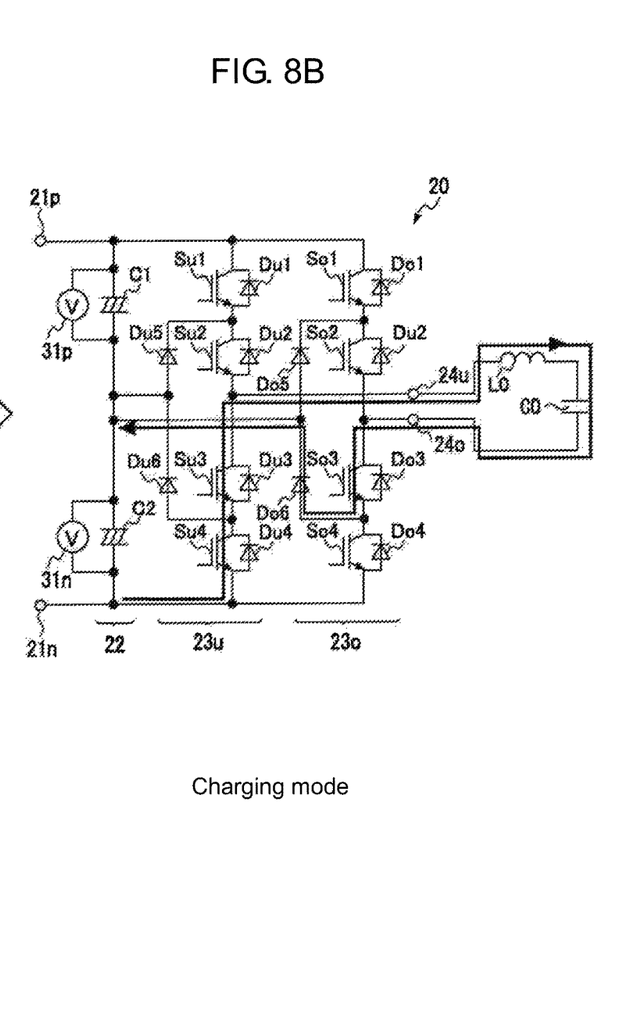
Figure 9A:
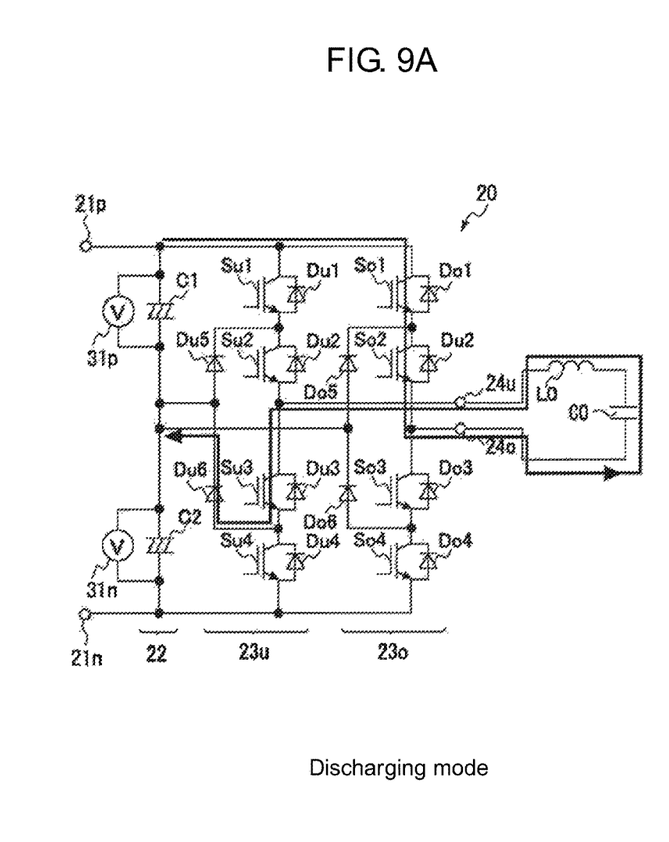
FIGS. 9A and 9B are diagrams describing the capacitor voltage balancing process.
Figure 9B:
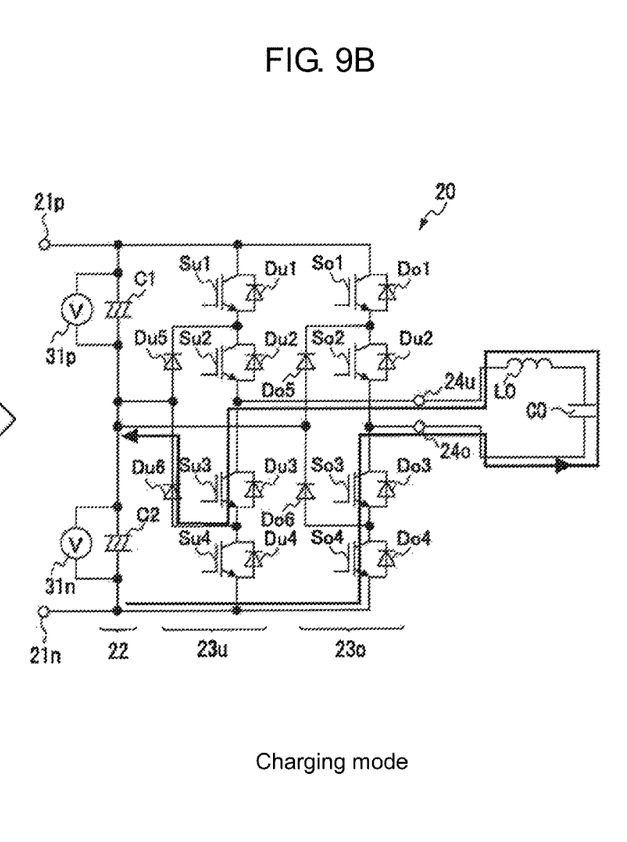
Figure 10A:
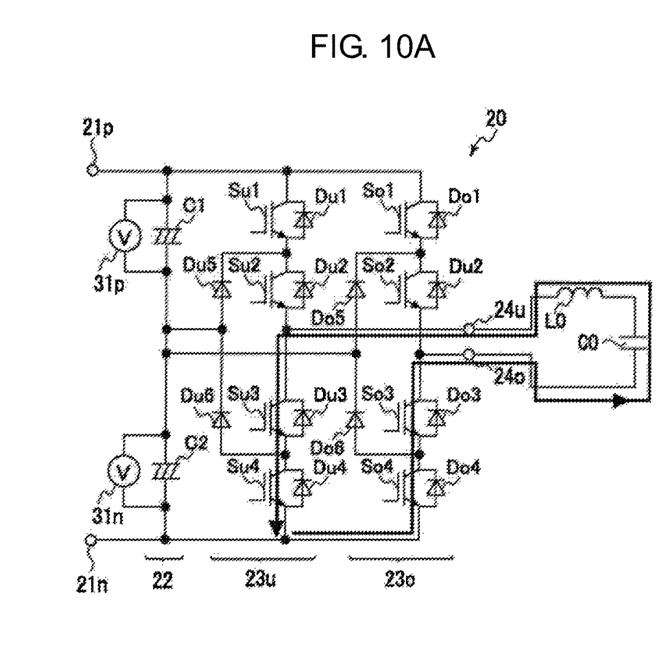
FIGS. 10A and 10B are diagrams describing a modification of the capacitor voltage balancing process.
Figure 10B:
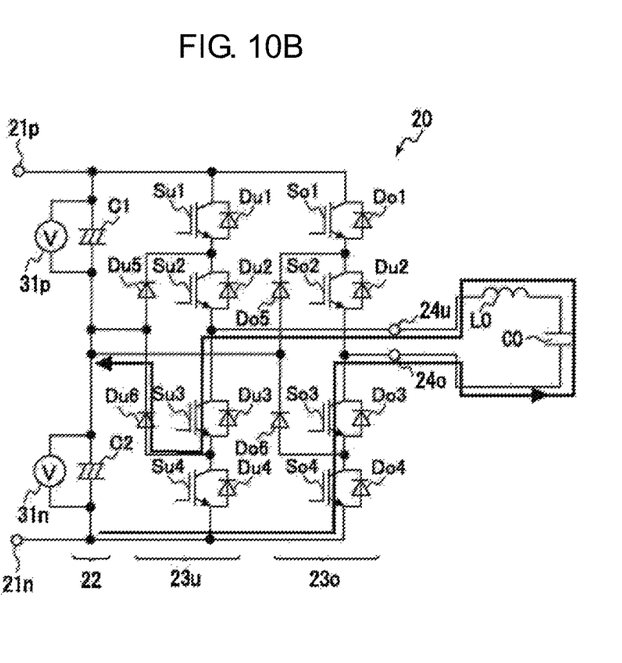

The capacitor voltage balancing process performed when the voltage across the first capacitor C1 is higher than the voltage across the second capacitor C2 may switch the inverter circuit 20 either from the state shown in FIG. 8A to the state shown in FIG. 10A or from the state shown in FIG. 10A to the state shown in FIG. 8A. The control over the inverter circuit 20 includes repeating the control over the inverter circuit 20 to alternately enter the states shown in FIGS. 8A and 8B in short cycles, and the control over the inverter circuit 20 to alternately enter the states shown in FIGS. 10A and 10B.

Referring back to FIG. 7, the subsequent processing will be described.

After completing the capacitor voltage balancing process, the control unit 30 starts a single-phase three-wire output control process (step S104). When the absolute value of the voltage difference is less than or equal to the first set value (Yes in step S102), the control unit 30 starts the single-phase three-wire output control process (step S104) without performing the capacitor voltage balancing process.

After starting the single-phase three-wire output control process, the control unit 30 first turns on the outlet relay (relay for connecting the output terminals of the inverter circuit 20 to 100 V and 200 V outlets for isolated operation). The control unit 30 then starts processing combining the control process described with reference to FIGS. 3 to 6B with a control process for reducing the voltage difference between the voltage across the first capacitor C1 and the voltage across the second capacitor C2 (capacitor voltage difference).

Depending on devices connected to the 100 V and 200 V outlets for isolated operation, the capacitors can have an imbalance between their voltages (that is, the voltage across the first capacitor C1 can differ from the voltage across the second capacitor C2) during isolated operation. Under the capacitor voltages with such an imbalance, as described above, the power converter cannot provide a normal single-phase three-wire output, or can have an overcurrent or an overvoltage applied to the components of the inverter circuit 20, which may damage the inverter circuit 20.

To reduce such failures, the control unit 30 is designed to perform a control process for controlling the O-phase potential to reduce the capacitor voltage difference when the capacitor voltage difference exceeds a third set value during isolated operation. The third set value is a predetermined value. The third set value may be, for example, equal to the above first set value.

More specifically, when the capacitor voltage difference exceeds the third set value, the control unit 30 starts the control process for controlling the O-phase potential to satisfy the conditions described below.

Condition 1: When the O-phase potential changes to a positive or negative value, more power is consumed from power stored in the capacitor with a higher voltage (either C1 or C2) than from power stored in the other capacitor.

Condition 2: The O-phase potential is changed to cause the time average to be zero within one switching cycle.

Condition 3: The time taken for the O-phase potential to be a positive or negative value corresponds to the capacitor voltage difference.

Under condition 3, the time taken for the O-phase potential to change may be proportional to the capacitor voltage difference, may be determined by using a value proportional to the capacitor voltage difference and a time integrated value of the capacitor voltage difference, or may be determined by using the value proportional to the capacitor voltage difference, the time integrated value of the capacitor voltage difference, and a time differentiated value of the capacitor voltage difference.

Figure 11:
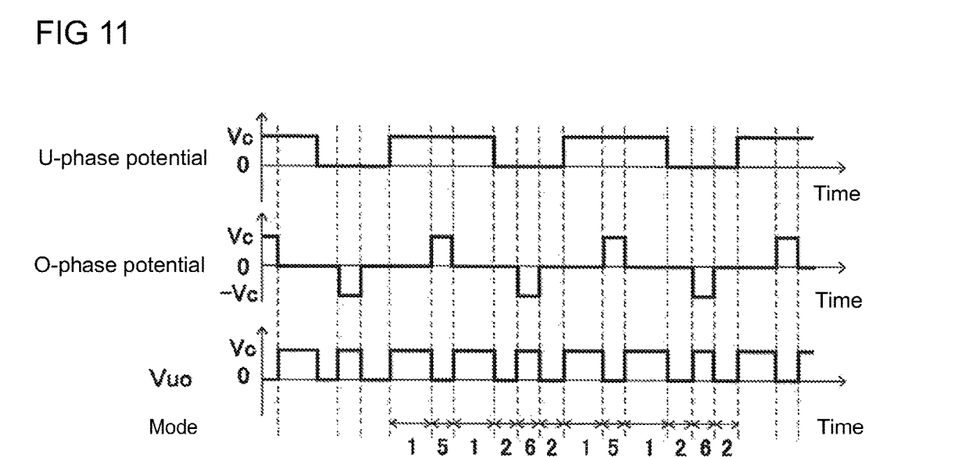
FIG. 11 is a time chart showing the patterns of temporal changes in the U-phase potential, the O-phase potential, and the output voltage Vuo when the O-phase potential is controlled.

When condition 1 is satisfied, the difference between the voltage across the capacitor C1 and the voltage across the capacitor C2 can be reduced. When condition 2 is satisfied, the waveforms of the voltages Vuo, Vwo, and Vuw are not affected adversely (the output waveforms are not distorted). More specifically, when the output voltage Vuo is positive under condition 2, the integrated value of the voltage Vuo in one switching cycle is equal to the value when the O-phase potential is unchanged as shown in FIG. 11. When condition 2 is satisfied, the waveforms of the voltages Vuo, Vwo, and Vuw are thus not affected adversely (the output waveforms are not distorted). Under condition 3, the difference between the voltages across the capacitors C1 and C2 can be reduced in a short time.

The inverter circuit 20 can change the U-phase potential and the O-phase potential as shown in FIG. 11 under conditions 1 to 3.

Figure 12:
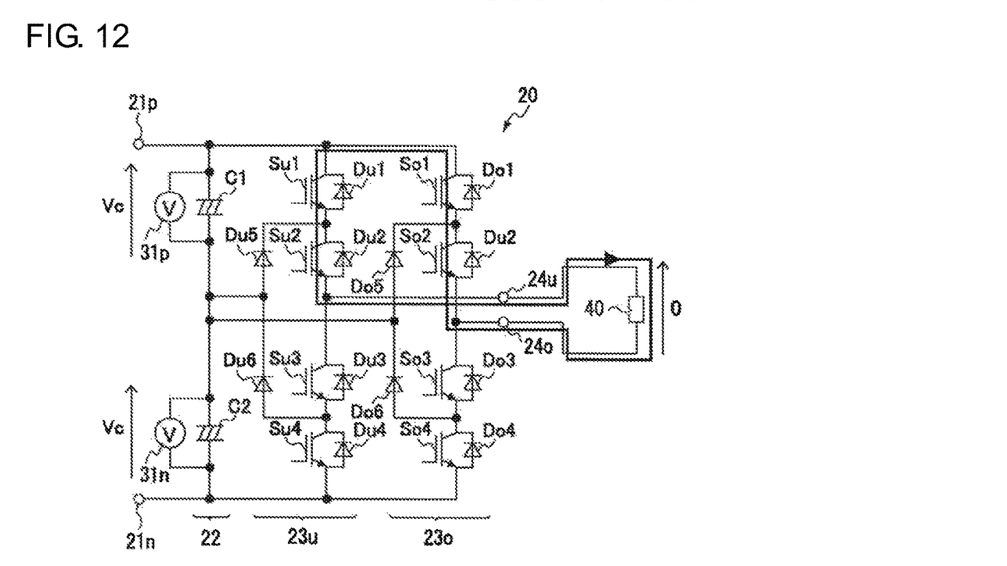
FIG. 12 is a diagram describing mode 5 used for controlling the O-phase potential.
Figure 13:
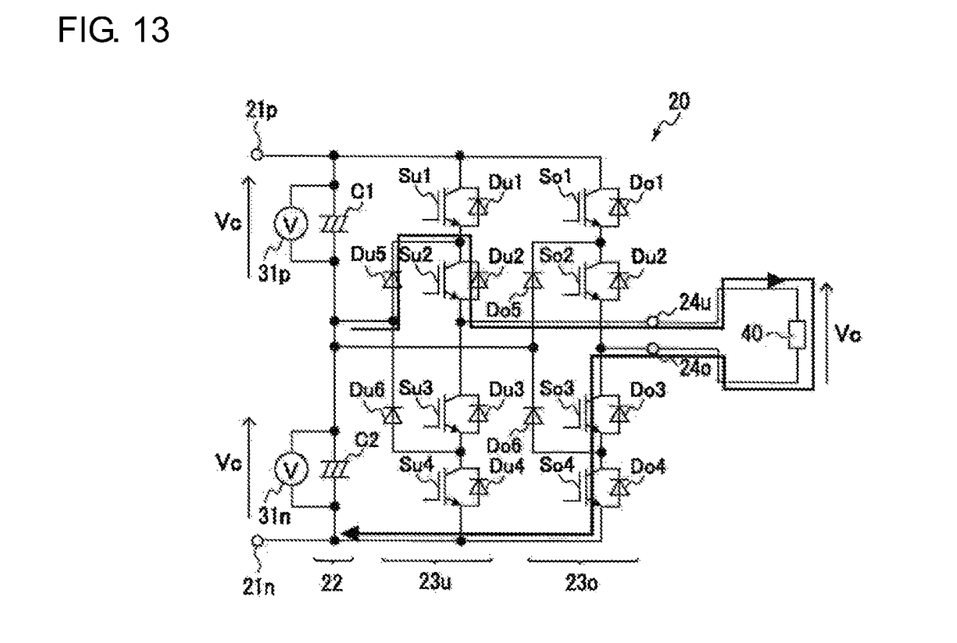
FIG. 13 is a diagram describing mode 6 used for controlling the O-phase potential.

More specifically, when the voltage across the second capacitor C2 is higher than the voltage across the first capacitor C1, switching the inverter circuit 20 from mode 1 (FIG. 5A) to mode 5 to form the current path shown in FIG. 12 will raise the O-phase potential (increase the O-phase potential to the potential of the terminal 21p, or to a positive potential) without changing the U-phase potential. Further, switching the inverter circuit 20 from mode 2 (FIG. 5B) to mode 6 to form the current path shown in FIG. 13 will lower the O-phase potential (decrease the O-phase potential to the potential of the terminal 21n, or to a negative potential) based on the power stored in the second capacitor C2 without changing the U-phase potential.

In the single-phase three-wire output control process performed when the output voltage Vuo is positive and the voltage across the second capacitor C2 is higher than the voltage across the first capacitor C1, the operation mode of the inverter circuit 20 is changed repeatedly in the order of modes 1, 5, 1, 2, 6, and 2 as shown in FIG. 11.

In the single-phase three-wire output control process under the above control executed when the output voltage Vuo is positive, the same control is also executed both when the output voltage Vuo is negative and when the output voltage Vuo is positive/negative. Under the above control, the U terminal 24u is temporarily connected from the neutral point to the input terminal 21p or 21n to satisfy conditions 1 to 3 described above.

The single-phase three-wire output control process starts a normal control process when the capacitor voltage difference decreases to less than or equal to a fourth set value (e.g., the same value as the second set value), which is less than or equal to the third set value.

Referring back to FIG. 7, the remaining steps included in the control process for isolated operation will be described.

After starting the single-phase three-wire output control process described above, the control unit 30 monitors the operation until receiving an instruction to stop the isolated operation mode (step S105). When receiving an instruction to stop the isolated operation mode (Yes in step S105), the control unit 30 ends the single-phase three-wire output control process (step S106), and also ends the control process for isolated operation and starts a three-phase AC output control process.

As described above, the power converter according to the present embodiment performs the process for controlling the O-phase potential to satisfy conditions 1 to 3 described above. The control process allows the voltage across one of the capacitors having a higher voltage to approach the voltage across the other capacitor without adversely affecting the waveforms of the voltages Vuo and Vwo (and Vuw). The power converter can thus provide a single-phase three-wire output, while reducing failures, including failures to provide a normal single-phase three-wire output. The control unit 30 included in the power converter performs the capacitor voltage balancing process (refer to, for example, FIGS. 7 and 8A and 8B). The power converter can thus reduce the failures that can occur when the single-phase three-wire output control process is started with a large difference between the voltages across the first and second capacitors C1 and C2.

Modifications

Figure 14:
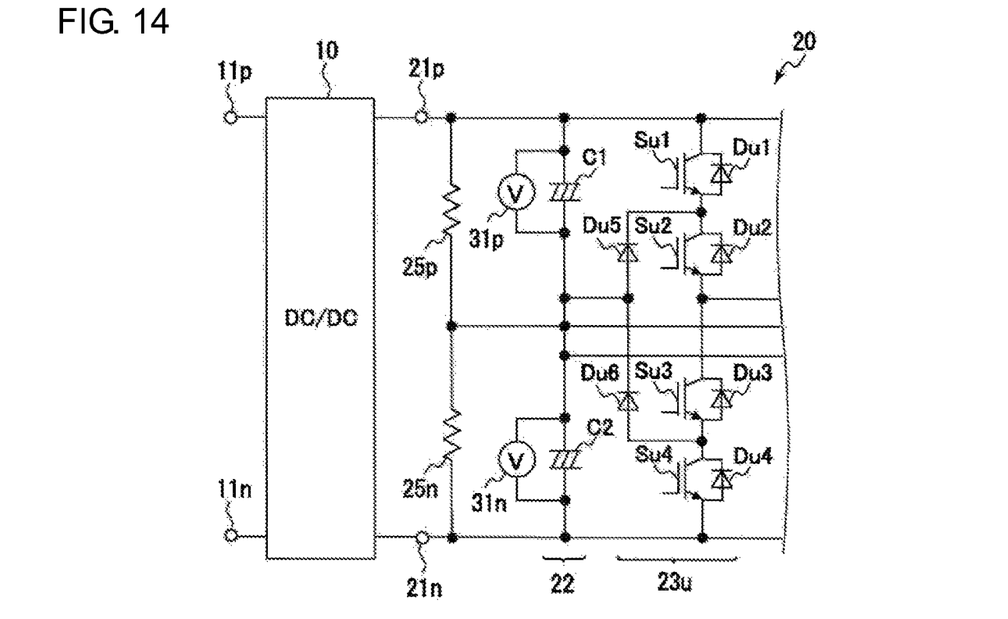
FIG. 14 is a diagram describing a power converter according to a modification of the embodiment.
Figure 15:
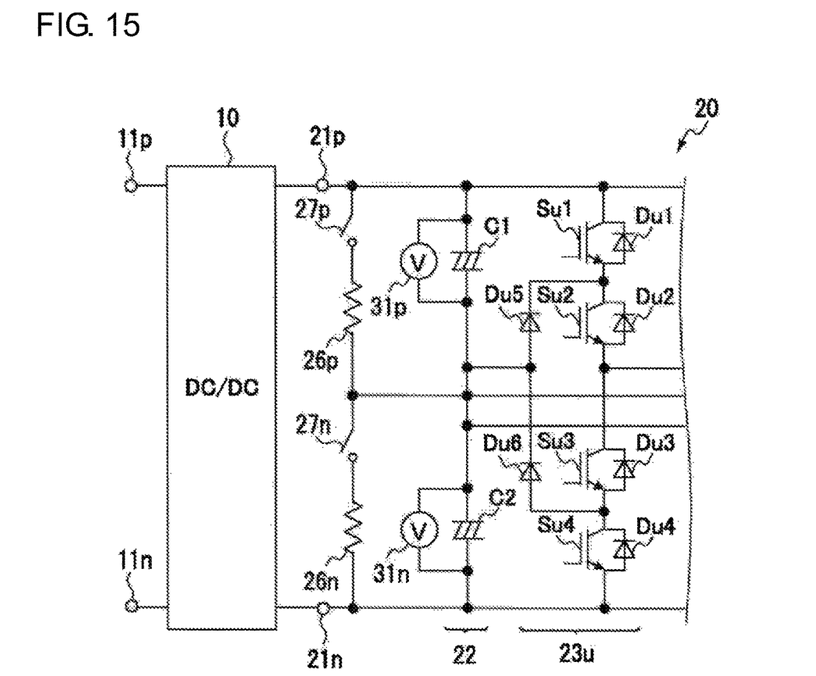
FIG. 15 is a diagram describing a power converter according to another modification of the embodiment.

The power converter according to the above embodiment may be modified in various forms. For example, the power converter may perform grid-connected operation in a single phase or may simply perform a single-phase three-wire output. As shown in FIG. 14, a power converter with another structure may include an inverter circuit 20 including a resistor 25p connected in parallel to a first capacitor C1 and a resistor 25n connected in parallel to a second capacitor C2. The resistors 25p and 25n each have a resistance of about several hundred kiloohms. This power converter may also wait for the capacitor voltage difference to decrease to less than or equal to the second set value, instead of the above capacitor voltage balancing process. A power converter with another structure shown in FIG. 15 includes a circuit including a resistor 26p and a switching element 27p connected in series, and a circuit including a resistor 26n and a switching element 27n connected in series. The circuit including the resistor 26p and the switching element 27p is connected in parallel to a first capacitor C1. The circuit including the resistor 26n and the switching element 27n is connected in parallel to a second capacitor C2. This power converter turns on the switching elements 27p and 27n only for a predetermined period of time or until the capacitor voltage difference decreases to less than or equal to a predetermined value, instead of the above capacitor voltage balancing process.

Figure 16:
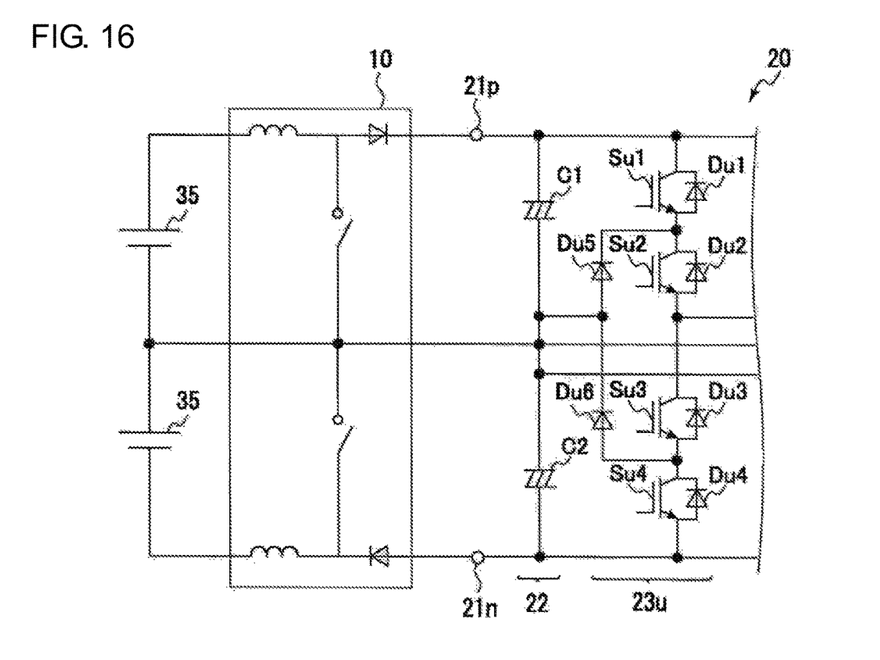
FIG. 16 is a diagram describing a power converter according to another modification of the embodiment.

The power converter may have another structure shown in FIG. 16. More specifically, the power converter may include a DC-DC conversion circuit 10, which is connected to two DC power generators 35 that can independently control the voltages to be applied across the first capacitor C1 and across the second capacitor C2. In this structure, the control unit 30 is simply modified to control the DC-DC conversion circuit 10 to allow the voltage across the first capacitor C1 to be equal to the voltage across the second capacitor C2. This power converter can reduce failures caused by an imbalance between the capacitor voltages at the start of or during its single-phase three-wire output.

The process for controlling the O-phase potential during the single-phase three-wire output control process may be any other process that changes the O-phase potential to a positive or negative value to allow more power to be consumed from power stored in one of the first and second capacitors C1 and C2 with a higher voltage than from power stored in the other capacitor. For example, when the output voltage Vuo is positive and the voltage across the second capacitor C2 is higher than the voltage across the first capacitor C1 (refer to FIG. 11), the operation mode of the inverter circuit 20 may be repeatedly changed in the order of modes 5, 1, 6, and 2, or in the order of modes 1, 5, 6, and 2.

The power converter (control unit 30) may be modified to constantly perform the process for controlling the O-phase potential. However, the control process may be eliminated when the voltage across the first capacitor C1 is substantially equal to the voltage across the second capacitor C2. Further, the control process is not to be turned on and off frequently. Thus, the control unit 30 may start the process for controlling the O-phase potential when the capacitor voltage difference exceeds the third set value, and may end the process when the capacitor voltage difference decreases to less than or equal to a fourth set value, which is smaller than the third set value.

When the capacitor voltage difference increases excessively during the single-phase three-wire output control process, the control unit 30 may suspend the single-phase three-wire output control process and turn off the outlet relay, and may resume the single-phase three-wire output after reducing the capacitor voltage difference through the capacitor voltage balancing process. The inverter circuit 20 may have specific structures (the circuit configuration and its elements) different from those described above, or may output power during isolated operation to a destination different from an outlet for isolated operation.

REFERENCE SIGNS LIST

10 DC-DC conversion circuit
11n, 11p input terminal
20 inverter circuit
21n, 21p input terminal
22 voltage dividing circuit
23o O-phase leg
23u U-phase leg
23w W-phase leg
24o O terminal
24u U terminal
24w W terminal
27n, 27p switching element
30 control unit
31n, 41p voltage sensor
35 DC power generator
40 load
C1 to C5 capacitor
Du1 to Du6, Do1 to Do6, Dw1 to Dw6 diode
Lu, Lo, Lw reactor
Su1 to Su4, So1 to So4, Sw1 to Sw6 switching element

The invention claimed is:

1. A power converter, comprising:
a neutral point clamped inverter circuit comprising a first capacitor and a second capacitor that are connected in series to divide an input direct-current (DC) voltage, a plurality of switching elements, and a first output terminal, a second output terminal, and a third output terminal; and
a controller configured with a program to perform operations comprising:
a single-phase three-wire output control operation for causing the inverter circuit to output a first AC voltage from between the first output terminal and the second output terminal and to output a second AC voltage having an inverted polarity from the first AC voltage from between the third output terminal and the second output terminal,
wherein:
the first capacitor stores first power resulting in a first voltage and the second capacitor stores second power resulting in a second voltage, and
during the single-phase three-wire output control operation, the controller is further configured with the program to perform operations comprising a potential control operation for changing a potential of the second output terminal by a positive value or a negative value to allow more power to be consumed from the first power or the second power stored in one of the first capacitor or the second capacitor having a higher one of the first voltage or the second voltage.

2. The power converter according to claim 1, wherein the controller is configured with the program to perform operations such that the potential control operation comprises changing the potential of the second output terminal by the positive value or the negative value to cause a time average of the potential of the second output terminal to be zero within one switching cycle.

3. The power converter according to claim 1, wherein the controller is configured with the program to perform operations such that the potential control includes comprises changing the potential of the second output terminal by the positive value or the negative value with a time taken for the potential of the second output terminal to change by the positive value and a time taken for the potential of the second output terminal to change by the negative value corresponding to a voltage difference between the first voltage and the second voltage.

4. The power converter according to claim 1, wherein the controller is configured with the program to perform operations such that the controller starts the potential control operation when a voltage difference between the first voltage and the second voltage is greater than or equal to a first predetermined value, and ends the potential control operation when the voltage difference is less than or equal to a second predetermined value smaller than the first predetermined value.

5. The power converter according to claim 1, wherein the first output terminal, second output terminal, and third output terminal are connected to a utility grid and a power consuming device, and
the controller is further configured with the program to perform operations to start the single-phase three-wire output control operation when receiving an instruction to start isolated operation.

6. The power converter according to claim 5, wherein the controller is configured with the program to perform operations further comprising:
determining whether a voltage difference between the first voltage and the second voltage is less than or equal to a predetermined threshold when receiving an instruction to start isolated operation,
starting the single-phase three-wire output control operation after performing a capacitor voltage balancing operation for reducing the voltage difference when the voltage difference exceeds the threshold, and starting the single-phase three-wire output control operation without performing the capacitor voltage balancing operation when the voltage difference is less than or equal to the threshold.

7. The power converter according to claim 6, wherein the capacitor voltage balancing operation comprises controlling the inverter circuit to charge one of the first capacitor and second capacitor having a lower one of the first voltage or the second voltage using power stored in the other one of the first capacitor and second capacitor having the higher one of the first voltage or the second voltage.

\* \* \* \* \*